United States Patent
Hamilton

(10) Patent No.: US 6,483,019 B1
(45) Date of Patent: Nov. 19, 2002

(54) MUSIC ANNOTATION SYSTEM FOR PERFORMANCE AND COMPOSITION OF MUSICAL SCORES

(75) Inventor: Michael M. Hamilton, San Jose, CA (US)

(73) Assignee: FreeHand Systems, Inc., Los Altos, CA (US)

( * ) Notice: Subject to any disclaimer, the term of this patent is extended or adjusted under 35 U.S.C. 154(b) by 0 days.

(21) Appl. No.: 09/917,992

(22) Filed: Jul. 30, 2001

(51) Int. Cl.[7] .............................................. G09B 15/02
(52) U.S. Cl. ................ 84/477 R; 84/483.1; 84/DIG. 6
(58) Field of Search ................... 84/609–614, 634–638, 84/477 R, 478, DIG. 6, 483.1, 483.2

(56) References Cited

U.S. PATENT DOCUMENTS

| | | | |
|---|---|---|---|
| 4,958,551 A | * | 9/1990 | Lui ........................ 84/477 R X |
| 5,276,272 A | * | 1/1994 | Masuda ................. 84/477 R X |
| 5,665,927 A | * | 9/1997 | Taki et al. ............. 84/477 R X |
| 5,728,460 A | | 3/1998 | Sitrick |
| 5,760,323 A | | 6/1998 | Romero et al. |
| 5,957,746 A | * | 9/1999 | Tsai ........................... 84/609 X |
| 6,084,168 A | | 7/2000 | Sitrick |
| 6,188,010 B1 | * | 2/2001 | Iwamura ....................... 84/609 |
| 6,201,174 B1 | * | 3/2001 | Eller ......................... 84/477 R |

* cited by examiner

*Primary Examiner*—Stanley J. Witkowski
(74) *Attorney, Agent, or Firm*—David Newman Chartered

(57) ABSTRACT

A system for displaying music. An Internet server stores the music. A computer accesses the Internet server and downloads a particular musical composition. The computer stores the particular musical composition in a computer memory. A plurality of viewers is coupled to the computer. The computer retrieves, from the computer memory, the particular musical composition, and sends the particular musical composition to the plurality of viewers. The plurality of viewers displays the particular musical composition retrieved from the computer memory. The computer controls display of the particular musical composition on the plurality of viewers. Each viewer has a stylus. Each stylus is used for annotating the particular musical composition with annotations.

12 Claims, 5 Drawing Sheets

FIFTEEN TWO PART INVENTIONS

JOHANN SEBASTIAN BACH

*) THE USE OF THREE FINGERS IN PLAYING BOTH THE MORDENT AND INVERTED MORDENT, THE MORE MODERN FINGERING IS STRONGLY URGED IN ALL CASES.

FIG.3

FIFTEEN TWO PART INVENTIONS

JOHANN SEBASTIAN BACH

*) THE USE OF THREE FINGERS IN PLAYING BOTH THE MORDENT AND INVERTED MORDENT, THE MORE MODERN FINGERING IS STRONGLY URGED IN ALL CASES.

FIG.4

MUSIC ANNOTATION SYSTEM FOR PERFORMANCE AND COMPOSITION OF MUSICAL SCORES

BACKGROUND OF THE INVENTION

This invention relates to electronic display of music, and more specifically, to display of music which can be downloaded from the Internet, and which electronically can be modified by a conductor and/or musician in an orchestra, band or other ensemble.

DESCRIPTION OF THE RELEVANT ART

Electronic display stands have been proposed, which can advance musical notes without the interruption of a conductor and/or musician. U.S. Pat. No. 5,760,323, entitled NETWORKED ELECTRONIC MUSIC DISPLAY STANDS, by Romero et al., which is incorporated herein by reference, proposed an electronic display stand which can be controlled by remote mechanical actuation, the sound of musical notes, or a timed interval. Several of these devices can be networked to display music to several musicians.

The prior art does not teach a system which can download music from the Internet, and which allows modification or annotation by a conductor or musician. Also lacked in the prior art is a file system optimized for display of musical notes.

SUMMARY OF THE INVENTION

A general object of the invention is the electronic display of musical notes, which can be downloaded from the Internet and which can be annotated by musicians and conductor.

Another object of the invention is a common file system for displaying of musical notes.

According to the present invention, as embodied and broadly described herein, a system for displaying music is provided, comprising an Internet server, a computer, a plurality of viewers and a plurality of styluses. The Internet server stores the music in a FreeHand System (FHS) file format, or may store the music in another file format.

The computer has a computer processor and a computer memory. The computer accesses the Internet server and downloads a particular musical composition. The particular musical composition has a plurality of groups of music. If the particular musical composition is not in the FHS file format, then the computer translates the particular musical composition to the FHS file format. The particular musical composition is stored in the FHS file format, or other file format. Each group in the plurality of groups of music has a variation in the particular musical composition corresponding to a particular musical instrument. The computer stores, using the FHS file format, or other file format, the particular musical composition in the computer memory. The computer retrieves, from the computer memory, the particular musical composition stored with the FHS file format, or other file format, and stores music in the computer memory using the FHS file format, or other file format.

The plurality of groups of viewers are coupled to the computer. The plurality of groups of viewers may be coupled using wires or cables, or using radio waves. Each group of viewers has at least one viewer. The plurality of groups of viewers corresponds to the plurality of groups of music, respectively. The plurality of groups of viewers, displays the plurality of groups of music of the particular musical composition retrieved from a viewer memory. The computer may control display of the particular musical composition on each of the plurality of groups of viewers.

The plurality of styluses has a stylus located at each viewer within each group of the plurality of groups of viewers, respectively. Thus, each viewer has a stylus. Each stylus annotates, at a respective viewer, the respective particular musical composition with annotations. The plurality of styluses generates a plurality of annotations corresponding to the plurality of groups of viewers, respectively. A respective viewer stores in a viewer memory, the annotations made by the stylus at that viewer.

The computer stores the plurality of annotations as an annotated file, for later display with the particular musical composition. The computer also uploads the annotated file to the Internet server.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 3 is an example of music for display on viewer of FIG. 2;

FIG. 4 is an example of annotations made with stylus on viewer of FIG. 2, to the music of FIG. 3.

DETAILED DESCRIPTION OF THE PREFERRED EMBODIMENTS

Figure 1:
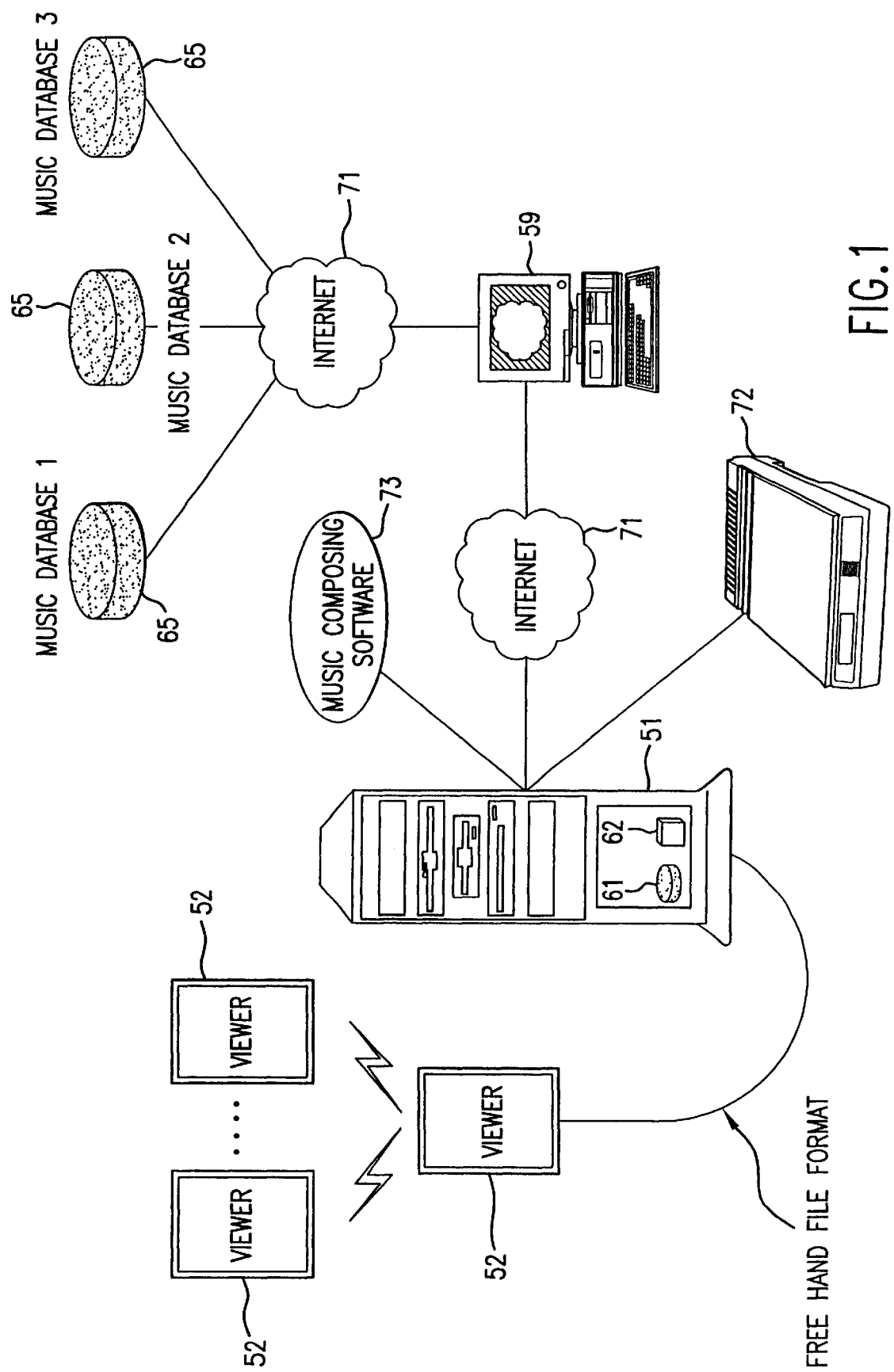
FIG. 1 shows a modifiable, electronic display of music system diagram.

Reference now is made in detail to the present preferred embodiments of the invention, examples of which are illustrated in the accompanying drawings, wherein like reference numerals indicate like elements throughout the several views.

The system for displaying music includes computer means, a plurality of viewer means, a plurality of stylus means and Internet means. The computer means is coupled to the Internet means for communicating data, as is well known in the art. The computer means is coupled to the plurality of viewer means, for communicating data. The Internet means stores music using a FreeHand System (FHS) file format. The Internet means may store the music using an other equivalent file format.

The computer means has a computer processor and a computer memory. The terms "computer processor" and "computer memory", as used herein, denote the processor and memory associated with the computer means. The computer means accesses the Internet means and downloads a particular musical composition stored in the FHS file format, or other file format. If the particular musical composition is not in the FHS file format, then the computer means translates the particular musical composition to the FHS file format. The computer means stores the particular musical composition in the computer memory, using the FHS file format or other file format. The means retrieves the particular musical composition, stored in the computer memory.

The plurality of viewer means is coupled to the computer means. The plurality of viewer means displays the particular musical composition retrieved from a viewer memory. The term "viewer memory" denotes a memory associated with the viewer means. The computer means may control display of the particular musical composition on the plurality of viewer means.

The plurality of stylus means is located at the plurality of viewer means, respectively. Thus, each viewer means has an associated stylus means. Each stylus means can be used by a user at a respective viewer means. The stylus means can be used for annotating the particular musical composition with annotations at the respective viewer means. The annotating generates a plurality of annotations corresponding to the plurality of viewer means, respectively. The computer means stores the plurality of annotations as an annotated file, for later display with the particular musical composition, and for uploading the annotated file to the Internet server.

The system for displaying music typically has a plurality of groups of viewer means and a plurality of groups of stylus means, respectively. The computer means accesses the Internet means and downloads a particular musical composition, which has a plurality of groups of music, stored in the FHS file format, or other file format. Each group has a variation in the particular musical composition corresponding to a particular musical instrument. The computer means stores, using the FHS file format, or other file format, the particular musical composition, as the plurality of groups of music, in the computer memory. The computer means retrieves the particular musical composition stored in the memory using the FHS file format, or other file format.

The plurality of groups of viewer means is coupled to the computer means. Each group of viewer means has at least one viewer means. The plurality of groups of viewer means corresponds to the plurality of groups of music, respectively. The plurality of groups of viewer means displays the plurality of groups of music of the particular musical composition retrieved from the computer memory, and sent to the plurality of groups of viewer means. The computer means controls display of the particular musical composition on each of the plurality of groups of viewer means.

The plurality of stylus means has each stylus means located at a respective viewer means within each group of the plurality of groups of viewer means. Each stylus means can be used for annotating, at a respective viewer means, the respective particular musical composition with annotations. Thus, the plurality of stylus means generates a plurality of annotations corresponding to the plurality of groups of viewers means, respectively.

The computer means stores the plurality of annotations as an annotated file. The annotated file later can be displayed with the particular musical composition. The computer means uploads the annotated file to the Internet means.

Figure 2:
FIG. 2 shows a viewer with a stylus.

In the exemplary arrangement shown in FIG. 1, of the system for displaying music, the computer means is embodied as a computer 51, the plurality of viewer means is embodied as a plurality of viewers 52, the plurality of stylus means is embodied as a plurality of styluses and the Internet means is embodied as an Internet server 59. The plurality of groups of viewer means is embodied as a plurality of groups of viewers, respectively. The plurality of groups of stylus means is embodied as a plurality of groups of styluses, respectively. FIG. 2 shows a representative viewer, with display 152, and with a stylus 153.

The Internet server 59 stores the music in some form of electronic or magnetic or optic file format. The computer 51 has a computer memory 61 and a computer processor 62. The terms "computer memory and computer processor", as used herein, refer to the respective memory and processor associated with the computer 51. The computer 51 accesses, via Internet 71, the Internet server 59. The computer 51 downloads a particular musical composition from the Internet server 59. If the particular musical composition is not in a FHS file format, then the computer 51 translates the particular musical composition to the FHS file format. Files in the FHS file format may be encrypted, using public key or asymmetrical key encryption algorithms, or a combination of asymmetrical key encryption algorithms, and secret key or symmetrical encryption algorithms. The encryption may be used to assist in preventing unauthorized copying of music. The encrypted files may be stored locally, on the computer 51, or on the Internet server 59. If required by copyright or contract, the distribution of sheet music can be managed by use of public key exchange and encryption technology.

The Internet server 59 typically will have access, directly on its own storage means, or through the Internet 71, to a plurality of music databases 65. Some of the music databases can be stored in the Internet server 59. Some of the music databases can be stored on other Internet servers. The computer 51 sends the particular musical composition to the plurality of viewers 52. The plurality of viewers 52 will display the particular musical composition downloaded from the Internet server 59.

The particular musical composition has a plurality of groups of music, stored in the FHS file format, or other file format. Each group of music has a variation in the particular musical composition corresponding to a particular musical instrument. An example of music for a particular group is shown in FIG. 3. FIG. 4 shows an annotated version of the music of FIG. 3. An orchestra, by way of example, might have a group of first violins, a group of second violins, a group of cellos, a group of drums, a group of oboes, and a group of flutes. A particular musical composition might include groups of music corresponding to each group of musical instruments. Thus, for the example, the particular musical composition would include a first group of music for the group of first violins, a second group of music for the group of second violins, a third group of music for the group of cellos, a fourth group of music for the group of drums, a fifth group of music for the group of oboes, and a sixth group of music for the group of flutes.

The computer 51 stores, using the FHS file format, or other format, the particular musical composition in the computer memory 62, using the FHS file format or other file format. The computer 51 retrieves, from the computer memory, the particular musical composition stored.

The plurality of groups of viewers 52 is coupled to the computer 51. The coupling may be by radio waves, cable, wire, infrared or other electronic, sonic or optical means. Each group of viewers has at least one viewer. Typically an USB port might be employed, or other network interface card (NIC) using radio waves, wire or cable.

Figure 5:
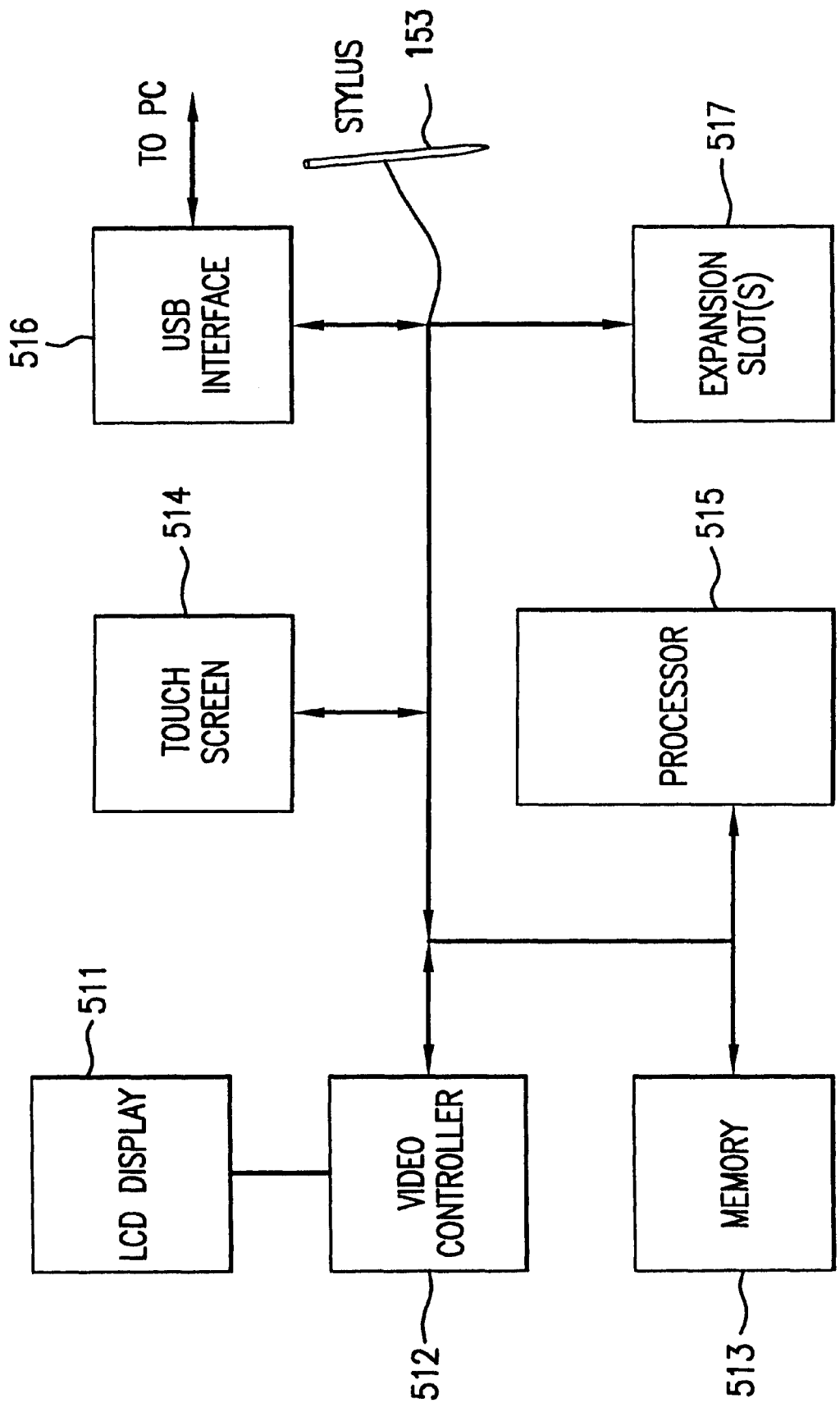
FIG. 5 is a block diagram of a viewer.

The plurality of groups of viewers 52 corresponds to the plurality of groups of music, respectively. The plurality of groups of viewers 52, receives the particular musical composition, sent from the computer 51, to the plurality of groups of viewers 52. Each viewer in the plurality of groups of viewers stores the particular musical composition received from the computer 51, in a respective viewer memory 513, as shown in FIG. 5. The term "viewer memory" as used herein, refers to a memory associated with a viewer. The plurality of groups of viewers displays the plurality of groups of music of the particular musical composition retrieved from their respective viewer memory. The computer 51 may control display of the particular musical composition on each of the plurality of groups of viewers 52.

The plurality of styluses 52 has a stylus located at each viewer within each group of the plurality of groups of viewers 52, respectively. Each stylus can be used to annotate, at a respective viewer, the respective particular musical composition with annotations. Thus, the plurality of styluses 53 can be used to generate a plurality of annotations corresponding to the plurality of groups of viewers, respectively. FIG. 4 illustrates an example of the music of FIG. 3, with annotations, annotated by the stylus 153.

Each viewer can store the respective annotations made by the stylus at that viewer, as a viewer-annotated file, in the viewer memory 513 of the viewer. Each viewer also can send the viewer-annotated file to the computer 51.

The computer 51 stores the plurality of viewer-annotated files in the computer memory 61. The computer also may combine the plurality of viewer-annotated files as a combined-annotated file. The computer 51 can later display the combined-annotated file, or the individual viewer-annotated files, with the particular musical composition. The computer 51 uploads the combined-annotated file, and/or the plurality of viewer-annotated files, via the Internet 71, to the Internet server 59.

A block diagram of a viewer is shown in FIG. 5. The viewer typically might include an LCD display 511, a video controller 512, a viewer memory 513, a touch screen 514, a viewer processor 515, an USB interface 516, expansion slots 517 and a stylus 153. The LCD display 511, the video controller 512, the viewer memory 513, the touch screen 514, the viewer processor 515, the USB interface 516, the expansion slots 517 and the stylus 153, are interconnected using a computer bus, such as an ISA bus, EISA bus or PCI bus, or the microchannel bus, as is well known in the art. The viewer also would include means for coupling to the computer 51. Such means might be an USB interface, or a network interface card (NIC) coupled to the computer 51 using a cable, wires, radio waves, or other optical means for coupling to the computer 51.

The viewer processor 515 controls the viewer, including responding to control signals from the computer 51. When a particular musical composition is received at the viewer, the viewer processor 515 stores the particular musical composition in the viewer memory 513. When the particular musical composition is to be displayed on the viewer, the viewer processor 515 has the display sent to the video card 512 and displayed on the LCD display 511.

A musician or other user at a particular viewer may annotate the music with the stylus 153. The annotations may be in color. For a particular viewer, the annotations are stored by the viewer processor 515 in the viewer memory 513 as a viewer-annotated file. With a plurality of viewers, the corresponding annotations for each viewer are stored in the respective viewer memory as a viewer-annotated file. The plurality of viewers can send the respective plurality of viewer-annotated files to the computer 51.

The computer 51 can store the plurality of viewer annotated files in the computer memory 61. Additionally, the computer 61, using the computer processor 62, may combine the plurality of viewer-annotated files as a combined-annotated file. The combined-annotated file is a compilation of the plurality of viewer-annotated files, either for display as a compilation, or for efficiency or convenience of transmitting or sending the plurality of viewer-annotated files to the Internet server 59.

Annotations may be integrated. For example, a conductor may annotate the music for first violins. The annotations may be passed from the conductor to the computer 51, and then sent to the group of first violins. This would be accomplished by making a viewer-annotated file for the conductor, and then sending the viewer-annotated file from the conductor to the computer 51. The viewer-annotated file of the conductor can be sent from the computer 51 to the first group, which represents the group of first violins.

The computer 51 can obtain music from a variety of sources, such as the Internet 71, scanners 72, music software 73 and other electronic, magnetic, or optic means. Any source of music can be inputted to the computer 51, and translated for display on one or more viewers 52.

The viewer is roughly equivalent to a laptop computer, A and not strictly a slave to the computer. The computer can download multiple pieces of music, from the Internet, scanner, music software, etc., and send the formatted music to the viewer. The viewer can store multiple pieces of music, and take the music with the viewer.

When looking at music on a viewer, and understanding annotations, a staff is a group of five lines separated by spaces. Each line and space represents a particular note. More than one staff is defined as a stave.

Each score is organized into groups of related staves, each such group called a system. The system function tries to organize its arguments into system-wide marks and staves full of musical objects. The main objects that a system notices are staff objects and system-wide brackets. The two kinds of brackets are bracket and brace. If a staff had both a bracket and a brace, divided strings in an orchestral score, for example, then put the bracket on the system, and the brace on the lower of the staves.

Additionally there are other notation marks that are critical to the performance of the piece. These notational symbols describe action such as loadness, softness, fade in, fade out, tempo. Again the present invention preserves this critical information.

Annotated description information is provided on how annotation works. The Viewer is essentially a stand alone PC with a touch screen. Therefore the following actions will be able to be performed on the viewer.

Annotate the base music file. This will be an overlay to the base music file.

Additional people can create separate annotations, each are separate overlays.

Each overlay can be turned off and on. All or several overlays can be turned on at the same time.

The annotations can be different colors and line widths. The annotations also will have an erase function.

All the annotations and the base file can be transferred onto the computer.

The viewer has an annotation mode and well as performance mode. In the performance mode the annotation is turned off and the touch screen becomes a mechanism to turn pages and navigate through the music.

The following annotation related actions can be performed by the software application running on a personal computer.

Import and display annotation and base music from the viewer.

Set the preferences for the annotations.

Do any cleanup operations to improve the readability of the annotations.

Upload the base file and annotation overlays to the Internet (Webservice).

Crop and adjust to view to be downloaded to the viewer for performance and annotation.

Thirdly, here are the different ways to import music into the FreeHand system and to be displayed by the viewer.

Scanner: Scanner capability can be integrated into the computer application. So any scanner with a twain capability, most are, can be used. Method would be to scan and print to the computer 51.

Music Software: Any music software can be used. Again the method is when the user wants to viewer his/her piece they would simply execute the print to a computer command.

Downloaded from the Internet and translate from different file formats. There are a variety of file formats out there and the present invention would provide translation capability integrated into the product. The following are commonly found formats: PDF, Adobe Acrobat; NIFF, Music graphic format; GIF; PNG; JPEG; Sibelius; Finale; and many other proprietary formats.

During use of the viewer for playing an instrument, the pages of the music may be changed by the touching touch screen 514, or other actuator means for changing pages. For example, a foot peddle could be coupled to the viewer through an expansion slot 515. The foot peddle can cause the pages of the viewer to change, by touching the foot peddle. The foot peddle may have a two way actuator for changing pages forward or backward, which is responsive to how the peddle is touched. The pages also may be turned by a wireless or by a cable, or from a remote controller. The remote controller might be the computer or a conductor or other source for controlling page turning.

The viewer can display more than notes from music. An entire music system can be stored so that not only notes are read, but also words, such as a song that goes with the notes, or other words. Also, the viewer can store annotations along with a variety of non-music related graphics and text.

A viewer only requires one display, since pages of music can be turned electronically, as discussed. Two or more displays are not required.

The present invention includes a method for displaying music. The method comprising the steps of storing, at an Internet server, the music in a FreeHand System (FHS) file format, or other file format; accessing, with a computer, the Internet server; downloading, with the computer, a particular musical composition, having a plurality of groups of music, stored in the FHS file format, or other file format, with each group having a variation in the particular musical composition corresponding to a particular musical instrument; storing, with the computer, using the FHS file format, the particular musical composition in a computer memory; retrieving, with the computer from the computer memory, the particular musical composition stored in the computer memory using the FHS file format, or other file format; displaying, with a plurality of groups of viewers, coupled to the computer, with each group of viewers having at least one viewer, with the plurality of groups of viewers corresponding to the plurality of groups of music, respectively, the plurality of groups of music of the particular musical composition retrieved from the computer memory; controlling, with the computer, display of the particular musical composition on each of the plurality of groups of viewers; annotating with a plurality of styluses, with a stylus located at each viewer within each group of the plurality of groups of viewers, respectively, at a respective viewer, the respective particular musical composition with annotations, thereby the plurality of styluses generating a plurality of annotations corresponding to the plurality of groups of viewers, respectively; storing, with the computer, the plurality of annotations as a combined-annotated file, or as a plurality of viewer-annotated files, for later display with the particular musical composition; and uploading, with the computer, the annotated file to the Internet server.

The FreeHand System File Format

The Freehand System (FHS) File Format is modeled somewhat after the PNG file format. The following discussion discloses the FreeHand System (FHS) file format.

Signature

The FHS file starts with an 8 byte signature modeled after the PNG signature. The signature, as shown in Table 1, has the following 8 bytes:

TABLE 1

| | |
|---|---|
| 142 | a byte with its most significant bit set |
| 70 | F |
| 72 | H |
| 32 | space |
| 13 | CR |
| 10 | LF |
| 26 | ^Z |
| 10 | LF |

The signature is designed to avoid most copying problems, such as downloading a binary file in.

Chunks

The bulk of the file has "Chunks". A chunk is a block of data with a specified type. A Chunk, as shown in Table 2, is in the following format:

TABLE 2

| Type | 4 bytes | A value indicating what type of chunk this is. The value, while handled as an integer, consists of four bytes representing four ASCII characters, such as "PAGE", or "TEXT". |
|---|---|---|
| Length | 4 bytes | The length of the data section. |
| Data | Length bytes | The data for this chunk. The meaning of the data is dependent on the chunk type. |

In the PNG file format, the Data section is followed by a four byte cyclic-redundant-check (CRC) code value to verify the integrity of the chunk. The CRC code may be added to the FHS file format, but it is not currently implemented.

In the PNG file format, the case of each character in the type has meaning. For example, "TEXT" would be different from "teXT". This feature is not implemented at this time in the freehand format.

The following sections discuss the chunk types currently implemented.

The Header Chunk (FHDR)

The Header Chunk is the first chunk in the FHS file format. There may be only one Header chunk. Currently, as shown in Table 3, the header chunk cincludes the following contents:

TABLE 3

| | | |
|---|---|---|
| Version Major | 1 byte | Major number of version |
| Version Minor | 1 byte | Minor number of version |
| Version Release | 1 byte | Release number of version |
| Pad | 1 byte | |

The header has a version number in the form of M.m.r, which is used for compatibility checking. Other fields can be added to the header.

The Pare Chunk (PAGE)

There is one Page Chunk for every page in the file. The page chunks are in order of the pages. The page chunk, as shown in Table 4, include the following:

TABLE 4

| | | |
|---|---|---|
| Type | 4 bytes | The type of page |
| data | Arbitrary bytes | The page data |

The type of the page is a four byte quantity encoded as a character string indicating the format of the page data. The type of page that is supported by the FHS file format is PNG format, with the Type ID of "PNG", with a space after the G to fill out the four bytes. The length of the data is the chunk length minus the four bytes for the type. For PNG data, this includes the complete content of a PNG file.

The Text Chunk (TEXT)

The Text Chunk allows insertion of various text properties into the file. These properties may be displayed by the UI. Examples of such properties may be Title, Composer, Copyright, or Part. The text chunk, as shown in Table 5, include the following:

TABLE 5

| | | |
|---|---|---|
| Property | Arbitrary bytes | A NULL terminated string |
| Value | Arbitrary bytes | A NULL terminated string |

An example of a Property might be "title" with a Value of "Mary had a Little Sheep".

The End Chunk (FEND)

The End Chunk is the last chunk in the file. The End Chuck no data. The end Chunk can be used to guarantee the completeness of the file. If the End Chuck is not present then the file is not complete.

Producing the FHS File

The below process of producing the freehand file is as follows:

1. Produce image files for the pages. This can be done using a scanner, a virtual printer driver, or any other method of producing images.
2. Size the images to the viewing size. The viewing size should be at least 480×640 pixels or 640×960 pixels. The former size would allow viewing in portrait mode on a VGA screen. The latter size would allow viewing in landscape mode, split into two parts.
3. Adjust the images to four bit greyscale and save as a PNG file. Four bit greyscale is not needed, but results in a small file. Pure black and white generally does not look good. The greyscale improves the clarity of the image.
4. Run the Freehand program which imports the PNG files. A single Import command imports all of the pages.
5. Save as a FHS file.

This procedure is done automatically, with creation of the images, resizing, and converting to PNG all done automatically. The process can be automated by adding a printer driver to print directly to FHS file format, and by adding scanning capabilities directly to the Freehand application.

There are many additions that can be added to the FHS file format.

Endian Support

In order to be able transfer the Freehand files between different machines, both big and little endian should be addressed. Currently, files written on one machine are not readable on another. The files should be standardized to one form, or support reading in either form. PNG standardizes on big endian. Note, that the FHS file format only needs the endianness of data. For embedded data, such as a PNG file, the data are left in whatever endianness that file needs.

CRC

CRC can be added to each chunk, similar to PNG. This will guarantee the integrity of our files when transferred.

Different Types of Pares

Currently, FHS file format only supports PNG based pages. Other formats of pages may be supported as well. The layout of the page chunk would make it easy to add other formats. Examples of the types of formats include:

1. Other image formats. In the future, an image format may be better than PNG.
2. Notational formats. Notational formats may be supported such as NIFF. These formats do not contain an image of the page, but instead contain a description of how to produce it. Using a notational format would allow editing the music.
3. Proprietary formats. Proprietary formats may be available from a company such as Finale or Sibelius, allowing a user to purchase an add on package for the appropriate software. With this add on package, output from the appropriate software package could be used on the freehand device.
4. Multipage formats. Currently each Page Chunk represents a single page of the file. Some music formats require supporting all of the pages in a single chunk, for example, if the chunk represented an embedded Finale file.
5. References to other files. In the current model, the files representing the pages (e.g. PNG files) are embedded in the freehand files. For some formats, we may choose to have a reference to a separate file. For example, instead of embedding a Sibelius file in the Freehand file, the Freehand file would point to the Sibelius file. This has the disadvantage of requiring that both files be transferred, but allows the Sibelius file to be edited with Sibelius without the need to extract it from and reinsert it into the Freehand file.

Annotation Support

Annotation is allowed on Freehand files. The primary form of annotation is in the form of ink, including white ink allowing for the "erasure" of music on the score. FHS file format could also support other types of annotations such as post-its.

Each page's annotations should be in a chunk. The annotations should be considered a layer on top of the page, and it can be turned on and off. Multiple layers of annotations can be supported in separate chunks. For example, one layer might be the musician's notes, and another layer the conductor's notes. The annotations in separate files from the pages can be supported, allowing, for example the conductor's notes to be sent between machines without the need to rewrite the main page. The annotation chunks could also be labeled, for example "First Violin", so that a single file of annotations could be available for a whole orchestra, but the First Violin would only see the appropriate annotations.

Table of Contents

Currently, the pages are stored in the file in order, and viewed in the order that they appear. A table of contents chunk can be added that provides logical information about the pages, allowing them to appear in a different order. Some things that could be provided by such a table of contents:

1. A repeat could be indicated. After playing page five for the first time, go back to page three. The second time after playing page five, continue to page six.
2. Rather than providing a separate file for each part, a single freehand file would contain all the parts. The table of contents would indicate that the sousaphone gets pages 1–3, the kazoo gets pages 4–5, and the triangle gets pages 6–15. When each musician opens the file, they would choose their part. The conductor could easily jump between the individual parts or view the score as a whole. This avoids the need to make sure that the right part is loaded on each musician's device, at the cost of transferring and storing much bigger files. A single physical page could be divided into smaller pages for display. Looking at a full sheet of music on a 640×480 pixels display results in a very small page, even in portrait mode. More readable results can be obtained at the page in landscape mode, and just look at the top or bottom half. However, the page cannot be divided in two, since that is likely to be in the middle of a system. The division will need to be at appropriate places in the page.
3. Timing information. If synchronized to Midi, timing information could allow the pages to be turned automatically. Putting this all together, a table of contents, as shown in Table 6, might look like this:

TABLE 6

| Instrument | Logical Page | Physical Page | Vertical Pixels | Timing | Comments |
|---|---|---|---|---|---|
| Sitar | 1 | 1 | 20–460 | 0 | Top half of physical page 1 |
| Sitar | 2 | 1 | 460–900 | 425 | Bottom half of physical page 1 |
| Sitar | 3 | 2 | 10–485 | 937 | Top half of physical page 2 |
| Sitar | 4 | 2 | 486–940 | 1483 | |
| Glock | 1 | 3 | 30–470 | 0 | Glock starts on physical page 3 |
| Glock | 2 | 3 | 470–920 | 357 | |
| Glock | 3 | 4 | 30–470 | 601 | |
| Glock | 4 | 3 | 470–920 | 925 | Repeat goes from top of page 4 to bottom of 3 |
| Glock | 5 | 4 | 30–470 | 1280 | |
| Glock | 6 | 4 | 470–920 | 1555 | Don't repeat the second time |

While Table 6 illustrates a single table of contents, in practice, this might be implemented as multiple chunks. For example, each instrument might have its own table of contents chunk, or we might choose to keep timing information separately.

Other Embedded Data

Other types of data can be embedded in the freehand file as well. For example, a midi file could be embedded in the Freehand file.

It will be apparent to those skilled in the art that various modifications can be made to the modifiable, electronic music display of the instant invention without departing from the scope or spirit of the invention, and it is intended that the present invention cover modifications and variations of the modifiable, electronic music display provided they come within the scope of the appended claims and their equivalents.

I claim:

1. A system for displaying music, comprising:

an Internet server for storing the music;

a computer, having a computer memory, for accessing the Internet server and for downloading a particular musical composition, having a plurality of groups of music, with each group having a variation in the particular musical composition corresponding to a particular musical instrument;

said computer for translating the particular musical composition to a FHS file format, including a header chuck, a page chuck, a text chuck, and an end chunk;

said computer for storing, using the FHS file format, the particular musical composition in said computer memory, said computer for retrieving, from said computer memory, the particular musical composition stored in said computer memory;

a plurality of groups of viewers, coupled to said computer, with each group of viewers having at least one viewer, with the plurality of groups of viewers corresponding to the plurality of groups of music, respectively, with the plurality of groups of viewers for displaying, using the FHS file format, the plurality of groups of music of the particular musical composition retrieved from said computer memory, with said computer for controlling display of the particular musical composition on each of the plurality of groups of viewers;

a plurality of styluses, with a stylus located at each viewer within each group of the plurality of groups of viewers, respectively, with each stylus for annotating, at a respective display, the respective particular musical composition with annotations, thereby the plurality of styluses generating a plurality of annotations corresponding to the plurality of groups of viewers, respectively; and said computer for storing the plurality of annotations as a combined-annotated file or as a plurality of viewer-annotated files, for later display with the particular musical composition, and for uploading the combined-annotated file or the plurality of viewer-annotated files to the Internet server.

2. A system for displaying music, comprising:

an Internet server for storing the music;

a computer, having a computer memory, for accessing the Internet server and downloading a particular musical composition;

said computer for translating the particular musical composition to a FES file format, including a header chuck, a page chuck, a text chuck, and an end chunk;

said computer for storing, using the FHS file format, the particular musical composition in said computer memory, said computer for retrieving, from said computer memory, the particular musical composition, stored in said computer memory;

a plurality of viewers, coupled to said computer, for displaying, using the FHS file format, the particular musical composition retrieved from said computer memory, with said computer for controlling display of the particular musical composition on the plurality of viewers;

a plurality of styluses, located at the plurality of viewers, respectively, with each stylus for annotating the particular musical composition with annotations, thereby generating a plurality of annotations corresponding to the plurality of viewers, respectively; and said computer for storing the plurality of annotations as a combined-annotated file, or as a plurality of viewer-annotated files, for later display with the particular musical composition, and for uploading the combined-annotated file, or the plurality of viewer-annotated files, to the Internet server.

3. A system for displaying music, comprising:

a viewer memory for storing music corresponding to a musical composition;

a viewer processor for accessing the Computer memory for retrieving, from said viewer memory, the music, stored storing, using a FHS file format including a header chuck, a page chuck, a text chuck, and an end chunk, in said viewer memory, and for storing music in said viewer memory;

a viewer for displaying, using the FHS file format, the music retrieved from said viewer memory, with the viewer processor for controlling display of the music on the viewer;

a stylus for annotating the music with annotations; and said viewer processor for storing the annotations as a viewer-annotated file, for later display with the music.

4. The system as set forth in claim 3, further including a computer, having a computer memory, for receiving a particular musical composition from any of scanner, music composition software, and electronic or magnetic or optical device, said computer for storing the particular musical composition in said computer memory, said computer for retrieving, from said computer memory, the particular musical composition, stored in said computer memory, and for sending the particular musical composition to said viewer processor.

5. A system for displaying music, comprising:

Internet means for storing the music;

computer means, having a computer memory, for accessing said Internet means and for downloading a particular musical composition, having a plurality of groups of music, with each group having a variation in the particular musical composition corresponding to a particular musical instrument;

said computer for translating the particular musical composition to a FHS file format, including a header chuck, a page chuck, a text chuck, and an end chunk;

said computer means for storing, using the FHS file format, the particular musical composition in said computer memory, said computer means for retrieving, from said computer memory, the particular musical composition stored in said computer memory;

a plurality of groups of viewer means, coupled to said computer means, with each group of viewer means having at least one viewer means, with the plurality of groups of viewer means corresponding to the plurality of groups of music, respectively, with the plurality of groups of viewer means for displaying, using the FHS file format, the plurality of groups of music of the particular musical composition retrieved from said memory, with said computer means for controlling display of the particular musical composition on each of the plurality of groups of viewer means;

a plurality of stylus means, with stylus means located at each viewer means within each group of the plurality of groups of viewer means, respectively, with each stylus means for annotating, at a respective viewer, the respective particular musical composition with annotations, thereby the plurality of stylus means generating a plurality of annotations corresponding to the plurality of groups of viewer means, respectively; and said computer means for storing the plurality of annotations as a combined-annotated file, or as a plurality of viewer-annotated files, for later display with the particular musical composition, and for uploading the combined-annotated file, or the plurality of viewer-annotated files, to said Internet means.

6. A system for displaying music, comprising:

Internet means for storing the music;

computer means, having a computer memory, for accessing said Internet means and for downloading a particular musical composition;

said computer for translating the particular musical composition to a FHS file format, including a header chuck, a page chuck, a text chuck, and an end chunk;

said computer means for storing the particular musical composition in said computer memory, said computer means for retrieving, from said memory, the particular musical composition, stored in said memory;

a plurality of viewer means, coupled to said computer means, for displaying the particular musical composition retrieved from said computer memory, with said computer means for controlling display, using the FHS file format, of the particular musical composition on the plurality of viewer means;

a plurality of stylus means, located at the plurality of viewer means, respectively, with each stylus means for annotating the particular musical composition with annotations, thereby generating a plurality of annotations corresponding to the plurality of viewer means, respectively; and said computer means for storing the plurality of annotations as a combined-annotated file, or as a plurality of viewer-annotated files, for later display with the particular musical composition, and for uploading the annotated file to the Internet server.

7. A system for displaying music, comprising:

memory means for storing, using a FHS file format including a header chuck, a page chuck, a text chuck, and an end chunk, music corresponding to a musical composition;

processor means for accessing said memory means for retrieving, from said memory means, the music, stored in said memory means, and for storing music in said memory means;

display means for displaying, using the FHS file format, the music retrieved from said memory means, with said processor means for controlling display of the music on the viewer means;

stylus means for annotating the music with annotations; and said processor means for storing the annotations as a viewer-annotated file, for later display with the music.

8. The system as set forth in claim 7, further including a computer, having a computer memory, for receiving a particular musical composition from any of scanner, music composition software, and electronic or magnetic or optical device, said computer for storing the particular musical composition in said computer memory, said computer for retrieving, from said computer memory, the particular musical composition, stored in said computer memory, and for sending the particular musical composition to said processor means.

9. A method for displaying music, comprising the steps of:

storing, using a FHS file format including a header chuck, a page chuck, a text chuck, and an end chunk, at an Internet server, the music;

accessing, with a computer, the Internet server;

downloading, with the computer, a particular musical composition, having a plurality of groups of music, with each group having a variation in the particular musical composition corresponding to a particular musical instrument;

storing, in the FHS file format, with said computer, the particular musical composition in a computer memory;

retrieving, with said computer from said computer memory, the particular musical composition stored in said memory;

displaying, using the FHS file format, with a plurality of groups of viewers, coupled to said computer, with each group of viewers having at least one viewer, with the plurality of groups of viewers corresponding to the plurality of groups of music, respectively, the plurality of groups of music of the particular musical composition retrieved from said computer memory, controlling, with said computer, display of the particular musical composition on each of the plurality of groups of viewers;

annotating with a plurality of styluses, with a stylus located at each viewer within each group of the plurality of groups of viewers, respectively, at a respective viewer, the respective particular musical composition with annotations, thereby the plurality of styluses generating a plurality of annotations corresponding to the plurality of groups of viewers, respectively;

storing, in the FHS file format, with said computer, the plurality of annotations as a combined-annotated file, or a plurality of viewer-annotated files, for later display with the particular musical composition; and uploading, with said computer, the annotated file to the Internet server.

10. A method for displaying music, comprising:

storing, at an Internet server, the music;

accessing, with a computer, having a computer memory, the Internet server;

downloading, with said computer, a particular musical composition;

translating the particular musical composition to a FHS file format, including a header chuck, a page chuck, a text chuck, and an end chunk;

storing, in the FHS tile format, with said computer, the particular musical composition in said computer memory;

retrieving, with said computer from said computer memory, the particular musical composition, stored in said computer memory;

displaying, using the FITS file format, with a plurality of viewers, coupled to said computer, the particular musical composition retrieved from said computer memory;

controlling, with said computer, display of the particular musical composition on the plurality of viewers;

annotating, with a plurality of styluses, located at the plurality of viewers, respectively, the particular musical composition with annotations, thereby generating a plurality of annotations corresponding to the plurality of viewers, respectively;

storing, with said computer, the plurality of annotations as a combined-annotated file, or as a plurality of viewer-annotated files, for later display with the particular musical composition; and uploading, with said computer, the combined-annotated file, or the plurality of viewer-annotated files, to the Internet server.

11. A method for displaying music, comprising:

storing, using a FHS file format including a header chuck, a page chuck, a text chuck, and an end chunk, in a viewer memory, music corresponding to a musical composition;

accessing, with a viewer processor, the viewer memory;

retrieving, with said viewer processor from said viewer memory, the music, stored in said viewer memory;

displaying, using the FHS file format, with a viewer, the music retrieved from said viewer memory;

controlling with said viewer processor, display of the music on the viewer;

annotating with a stylus, the music with annotations; and storing, in the FHS file format, with said viewer processor, the annotations as a viewer-annotated file, in the viewer processor, for later display with the music.

12. The method as set forth in claim 11, further including the steps of:

receiving, at a computer, a particular musical composition from any of scanner, music composition software, and electronic or magnetic or optical device;

storing the particular musical composition in a computer memory;

retrieving, from said computer memory, the particular musical composition, stored in said computer memory; and sending the particular musical composition to said viewer processor.

* * * * *